US012705187B2

(12) United States Patent
Chiang et al.

(10) Patent No.: US 12,705,187 B2
(45) Date of Patent: Aug. 11, 2026

(54) METHOD FOR ACCESSING STORAGE DEVICE AND ASSOCIATED SYSTEM-ON-CHIP

(71) Applicant: Faraday Technology Corp., Hsin-Chu City (TW)

(72) Inventors: Feng-Hsin Chiang, Hsin-Chu City (TW); Sen-Chin Liu, Hsin-Chu City (TW); Tai-Xiang Liao, Hsin-Chu City (TW)

(73) Assignee: Faraday Technology Corp., Hsin-Chu City (TW)

( * ) Notice: Subject to any disclaimer, the term of this patent is extended or adjusted under 35 U.S.C. 154(b) by 53 days.

(21) Appl. No.: 19/010,157

(22) Filed: Jan. 5, 2025

(65) Prior Publication Data

US 2026/0161573 A1 Jun. 11, 2026

(30) Foreign Application Priority Data

Dec. 5, 2024 (TW) ................................ 113147221

(51) Int. Cl.
*G06F 21/00* (2013.01)
*G06F 12/02* (2006.01)
(Continued)

(52) U.S. Cl.
CPC ...... *G06F 12/1408* (2013.01); *G06F 12/0246* (2013.01); *G06F 21/00* (2013.01); *G06F 21/70* (2013.01); *G06F 21/72* (2013.01); *G06F 21/78* (2013.01); *G06F 21/79* (2013.01); *G06F 2212/1052* (2013.01); *G06F 2221/2107* (2013.01)

(58) Field of Classification Search
CPC .. G06F 12/1408; G06F 12/0246; G06F 21/00; G06F 21/70; G06F 21/72; G06F 21/78; G06F 21/79; G06F 2221/2107; G06F 2212/1052
USPC .......................................................... 713/193
See application file for complete search history.

(56) References Cited

U.S. PATENT DOCUMENTS 11,650,929 B2 * 5/2023 Kim .................... G06F 12/0246 711/157
2019/0250855 A1 * 8/2019 Kachare ................ G06F 3/0658
(Continued)

FOREIGN PATENT DOCUMENTS

EP 4156594 A1 * 3/2023 ........... G06F 12/145
TW 202147136 A 12/2021
(Continued)

*Primary Examiner* — Thanh T Le
(74) *Attorney, Agent, or Firm* — Winston Hsu

(57) ABSTRACT

The present invention provides a method for accessing a storage device. The method includes the steps of: establishing a command and writing the command into an entry of a submission queue, wherein the command includes queue identity of the submission queue, an index value of the entry, a logical block address offset and a physical address; setting a sibling submission queue, wherein the sibling submission queue comprises multiple security information; retrieving specific security information from the sibling submission queue according the queue identity corresponding to the command and the index value of the entry; and encrypting or decrypting data according to the logical block address offset of the command and the specific security information.

10 Claims, 5 Drawing Sheets

(51) Int. Cl.

| | |
|---|---|
| ***G06F 12/04*** | (2006.01) |
| ***G06F 12/14*** | (2006.01) |
| ***G06F 21/70*** | (2013.01) |
| ***G06F 21/72*** | (2013.01) |
| ***G06F 21/78*** | (2013.01) |
| ***G06F 21/79*** | (2013.01) |

(56) References Cited

U.S. PATENT DOCUMENTS

2020/0225883 A1* 7/2020 Bhimani ................. G06F 18/23
2022/0206958 A1 6/2022 LeMay
2023/0094171 A1* 3/2023 Snir .................... G06F 12/0238
726/26
2024/0045958 A1* 2/2024 Bunin ................... G06F 21/566

FOREIGN PATENT DOCUMENTS

TW 202219778 A 5/2022
TW 202418087 A 5/2024
TW 202420132 A 5/2024
WO WO-2024196453 A1 * 9/2024 ......... G06F 12/1408

* cited by examiner

METHOD FOR ACCESSING STORAGE DEVICE AND ASSOCIATED SYSTEM-ON-CHIP

BACKGROUND OF THE INVENTION

1. Field of the Invention

The present invention relates to a security control mechanism of an electronic device.

2. Description of the Prior Art

Due to their low latency, high data read/write rates, and reliable data storage capabilities, Solid State Drives (SSDs) have become an essential storage device in modern information technology infrastructure, replacing traditional Hard Disk Drives (HDDs). In addition, to prevent the theft of storage devices and the potential leakage of privacy or confidential information, some SSDs are designed with encryption and decryption functions. However, the current encryption mechanisms used in SSDs often require significant hardware resources or software modifications, which increases the cost of design and manufacturing.

SUMMARY OF THE INVENTION

One of the objectives of the present invention is to propose an on-the-fly encryption and decryption mechanism for storage devices, which requires only fewer hardware resources and software modifications, in order to address the issues described in the prior art.

According to one embodiment of the present invention, a method for accessing a storage device is disclosed. The method comprises the steps of: establishing a command and writing the command into an entry of a submission queue, wherein the command comprises a queue identity of the submission queue, an index value of the entry, a logical block address offset and a physical address; setting a sibling submission queue, wherein the sibling submission queue comprises multiple security information; retrieving specific security information from the sibling submission queue according the queue identity corresponding to the command and the index value of the entry; and encrypting or decrypting data according to the logical block address offset of the command and the specific security information.

According to one embodiment of the present invention, a system-on-chip configured to access a storage device is disclosed. The system-on-chip comprises a core circuit, a security control circuit and a security engine. The core circuit is configured to establish a command and write the command into an entry of a submission queue, wherein the command comprises a queue identity of the submission queue, an index value of the entry, a logical block address offset and a physical address; and set a sibling submission queue, wherein the sibling submission queue comprises multiple security information. The security control circuit is configured to retrieving specific security information from the sibling submission queue according the queue identity corresponding to the command and the index value of the entry. The security engine is configured to encrypt or decrypt data according to the logical block address offset of the command and the specific security information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
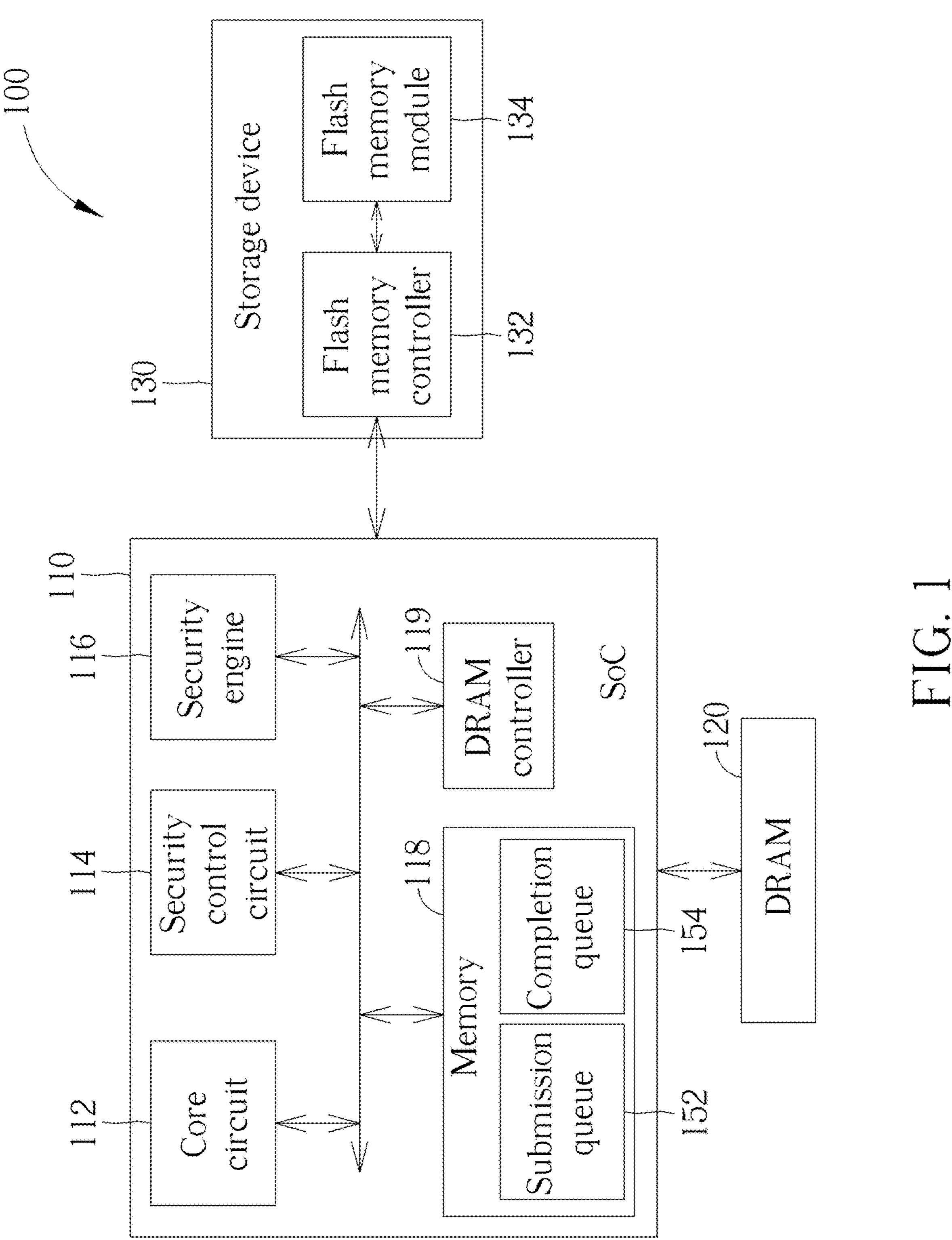
FIG. 1 is a schematic diagram of an electronic device according to an embodiment of the present invention.

FIG. 1 is a schematic diagram of an electronic device 100 according to an embodiment of the present invention. As shown in FIG. 1, the electronic device 100 includes a system-on-chip (SoC) 110, a Dynamic Random Access Memory (DRAM) 120 and a storage device 130. In this embodiment, the SoC 110 includes a core circuit 112, a security control circuit 114, a security engine 116, a memory 118 and a DRAM controller 119. For the storage device 130, the SoC 110 can function as a host device. The storage device 130 can be any storage device that includes a flash memory controller 132 and a flash memory module 134, such as a Solid State Drive (SSD), where the flash memory module 134 includes one or more flash memory chips, and the flash memory controller 132 is used to control access to the flash memory module 134. In this embodiment, the SoC 110 accesses the storage device 130 according to the Non-Volatile Memory Express (NVMe) specification, and a Peripheral Component Interconnect Express (PCIe) interface is used for communication between the SoC 110 and the storage device 130.

In the process of accessing the storage device 130, the SoC 110 uses a submission queue 152 and a completion queue 154, which are stored in the memory 118. The submission queue 152 is used for the core circuit 112 to write the contents of a command, such as a write or read command, for the storage device 130 to execute. The completion queue 154 is used for the storage device 130 to reply to the SoC 110 regarding the execution status of the command. Through the submission queue 152 and completion queue 154, the SoC 110 can complete the access and management of the storage device 130. It should be noted that since the functions and operations of the submission queue 152 and completion queue 154 are well-known to NVMe-related professionals, and the focus of the present invention is on the encryption and decryption mechanism within the SoC 110, the details of the SoC 110 accessing the storage device 130 are omitted here.

Figure 2:
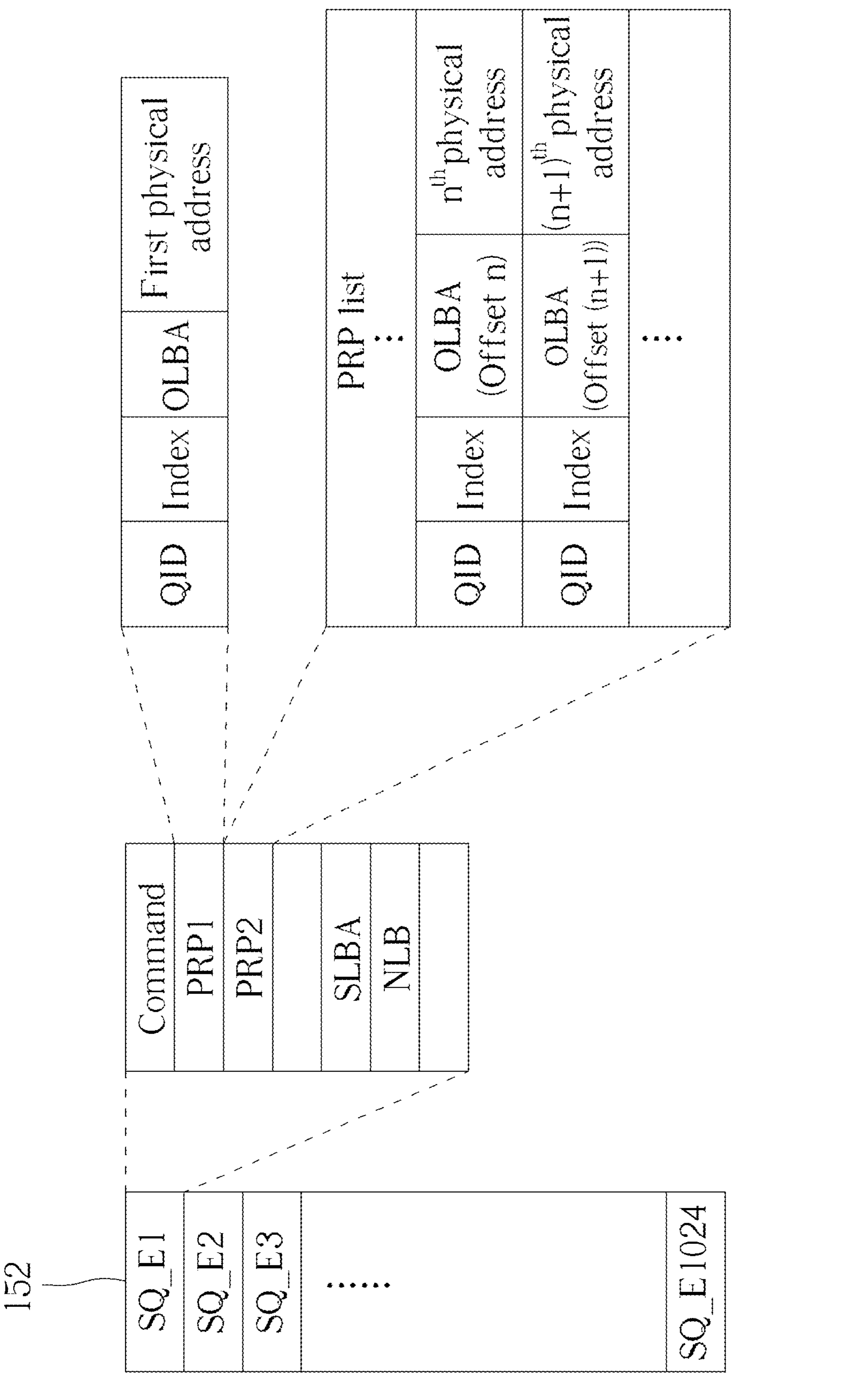
FIG. 2 is a schematic diagram of a command format written to a submission queue by a core circuit according to an embodiment of the present invention.

FIG. 2 is a schematic diagram of the command format written to the submission queue 152 by the core circuit 112 according to an embodiment of the present invention. As shown in FIG. 2, the submission queue 152 includes multiple entries, such as 1024 entries, labeled SQ_E1 to SQ_E1024, where each entry stores a command from the core circuit 112 to the storage device 130. In this embodiment, each command stored in an entry includes at least a first Physical Region Page (PRP1), a second Physical Region Page (PRP2), a Starting Logical Block Address (SLBA), a Number of Logical Blocks (NLB), and other information defined in the NVMe specification. In this embodiment, the PRP1 includes at least four fields: queue identity (QID), an index value, a Logical Block Address Offset (OLBA) and a first physical address. The queue identity represents the identity of the submission queue 152; the index value indicates which entry in the submission queue 152 the command is stored in. For example, if the command is stored in the first entry of the submission queue 152, SQ_E1, the index value would be "1." The OLBA records the offset of the logical block address relative to the SLBA. Typically, in the case of the PRP1, the OLBA may be "0" if it corresponds to the SLBA. The first physical address points to a buffer space in the DRAM 120, which is used to store data corresponding to the logical block address. The PRP2 includes a Physical Region Page List (PRP list), where the PRP list includes the offsets of the remaining logical addresses for the command, as well as their associated queue identity, index value and corresponding physical addresses. Taking FIG. 2 as an example, one row of the PRP2 includes the queue identity, index value, OLBA "n", and the $n^{th}$ physical address. The queue identity represents the identity of the submission queue 152, and the index value indicates which entry in the submission queue 152 the command is stored. The OLBA records the offset of the logical block address relative to the SLBA. The $n^{th}$ physical address points to a buffer space in DRAM 120, which is used to store the data of the corresponding logical block address.

Figure 3:
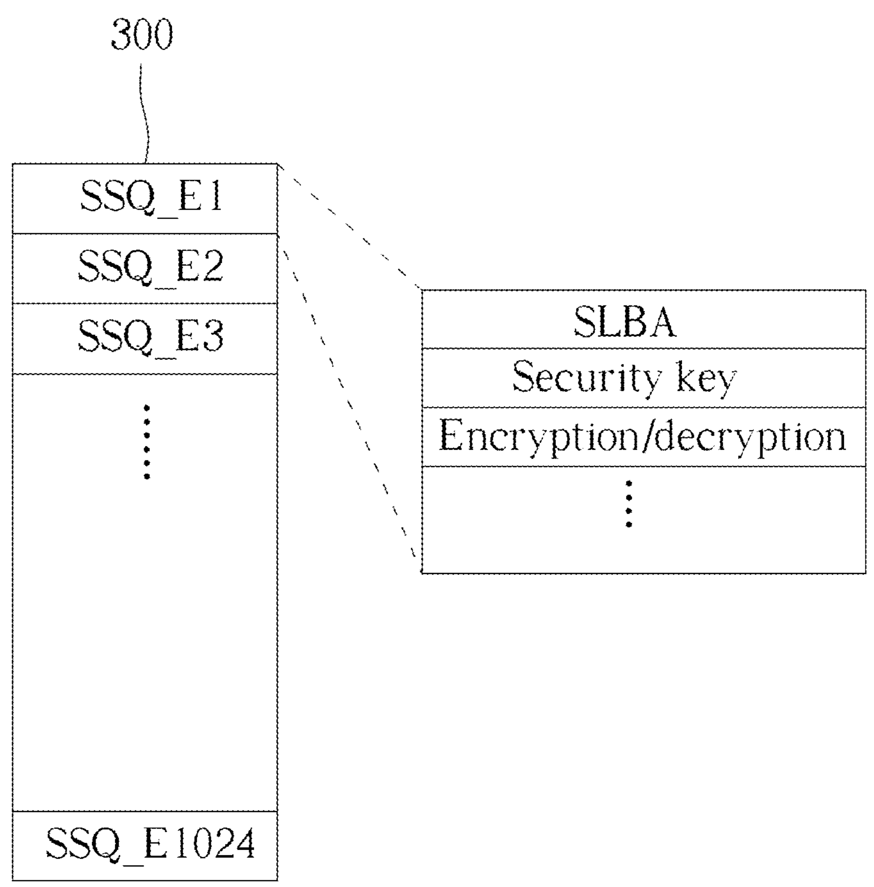
FIG. 3 is a schematic diagram of a sibling submission queue according to an embodiment of the present invention.

FIG. 3 is a schematic diagram of an sibling submission queue (SSQ) 300 according to an embodiment of the present invention, where the sibling submission queue 300 can be stored in memory 118 or any suitable storage component within the SoC 110. As shown in FIG. 3, the sibling submission queue 300 includes multiple entries, such as 1024 entries, labeled SSQ_E1 to SSQ_E1024, with each entry storing a set of security information. In this embodiment, the security information includes a SLBA, a security key and encryption/decryption information. In this embodiment, the sibling submission queue 300 has the same number of entries as the submission queue 152, and each entry in the sibling submission queue 300, SSQ_E1 to SSQ_E1024, corresponds to an entry in the submission queue 152, SQ_E1 to SQ_E1024. Furthermore, the SLBA in an entry of the sibling submission queue 300 is the same as the SLBA recorded in the corresponding entry of the submission queue 152. The security key is used for subsequent encryption and decryption processes, and the encryption/decryption information indicates whether encryption or decryption is to be performed. For example, when the encryption/decryption information is "0," it indicates decryption, while "1" indicates encryption.

Figure 4:
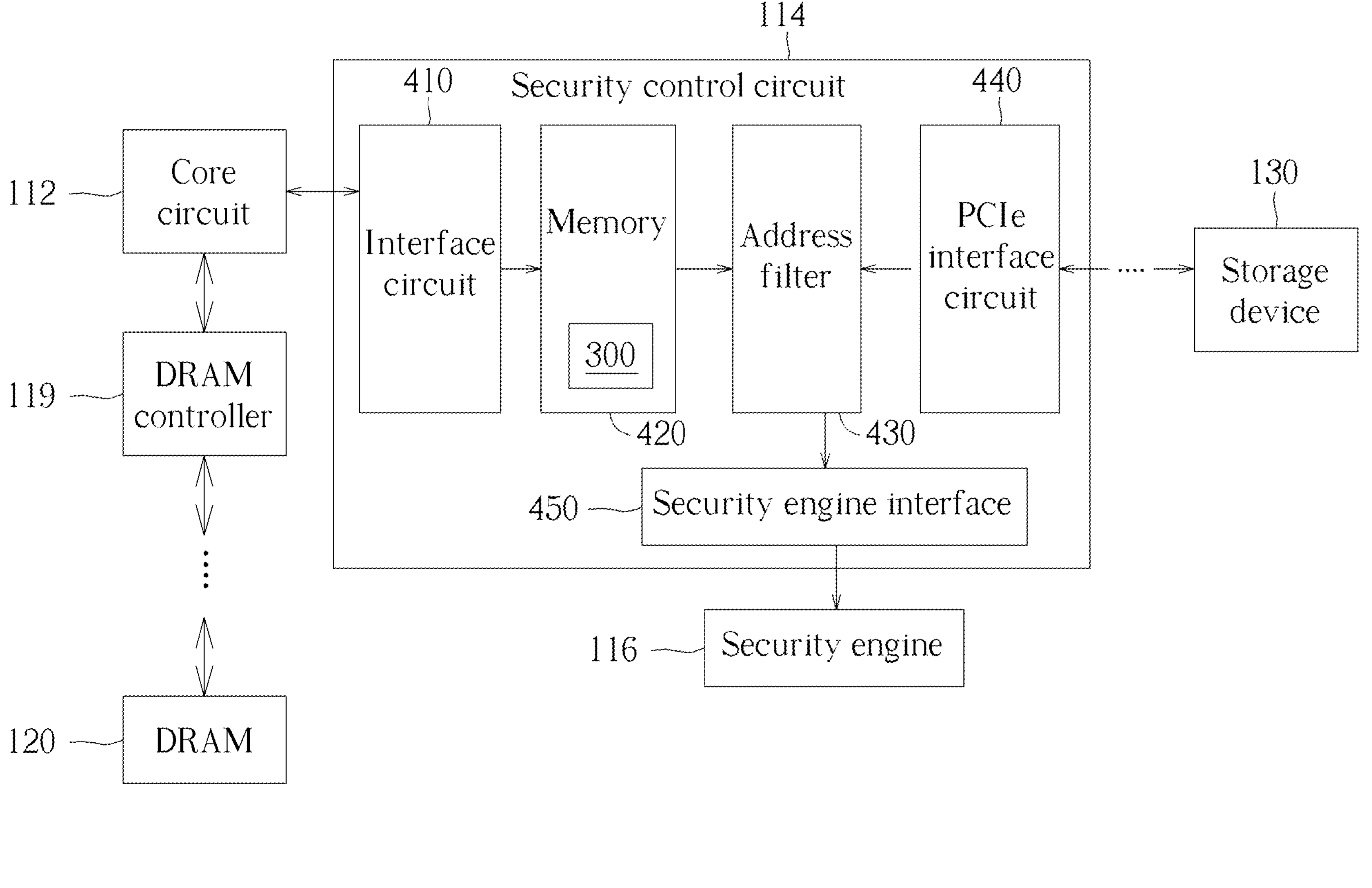
FIG. 4 is a schematic diagram of a security control circuit according to an embodiment of the present invention.

FIG. 4 is a schematic diagram of the security control circuit 114 according to an embodiment of the present invention. As shown in FIG. 4, the security control circuit 114 includes an interface circuit 410, a memory 420, an address filter 430, a PCIe interface circuit 440 and a security engine interface 450. The interface circuit 410 serves as the communication interface between the core circuit 112 and the security control circuit 114. The PCIe interface circuit 440 is used for communication with the storage device 130, while the security engine interface 450 serves as the communication interface between the security control circuit 114 and the security engine 116.

Figure 5:
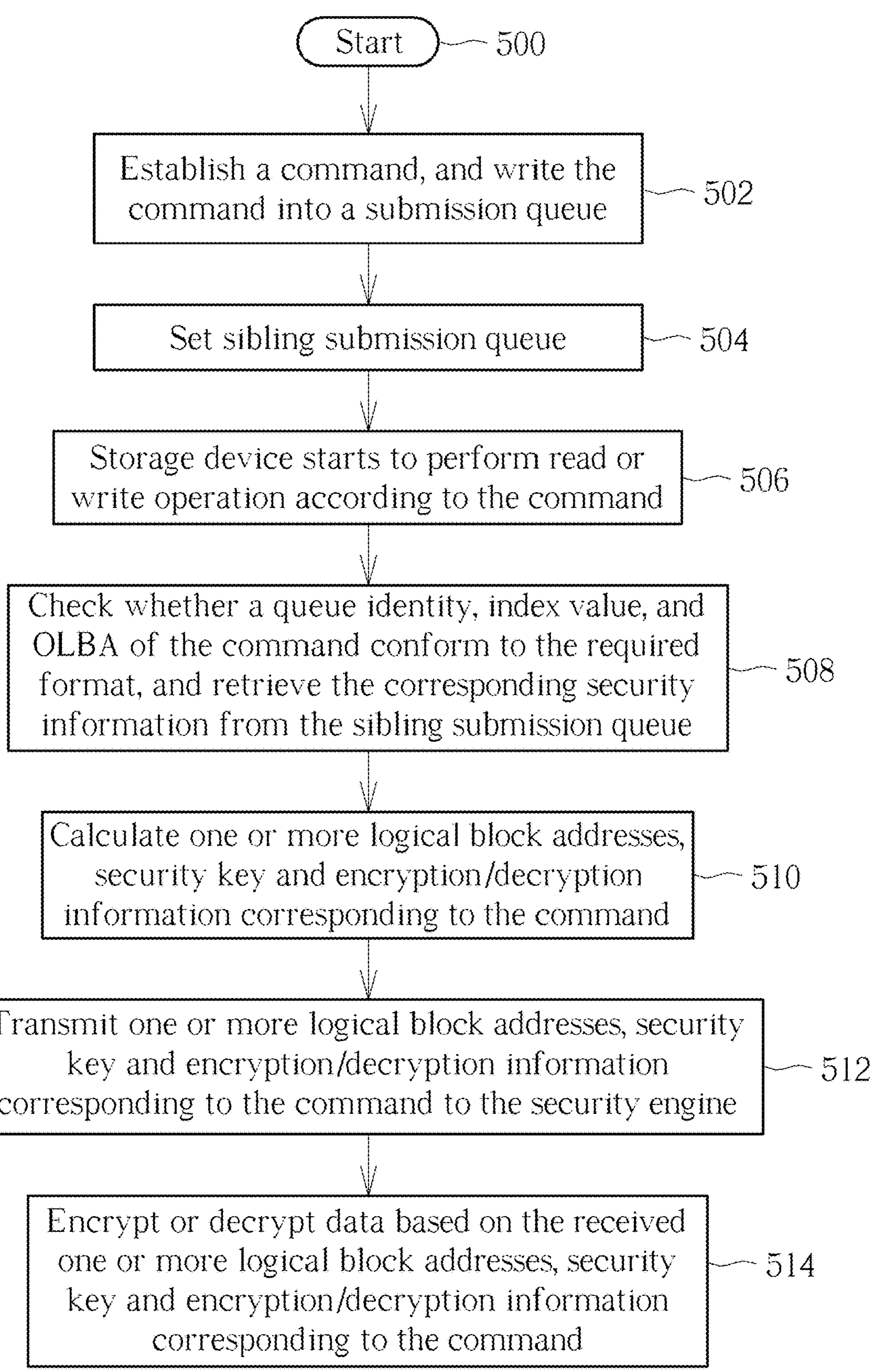
FIG. 5 is a flowchart of a system-on-chip accessing a storage device according to an embodiment of the present invention.

FIG. 5 is a flowchart showing the process of the SoC 110 accessing the storage device 130 according to an embodiment of the present invention. Referring to FIG. 2 to FIG. 5, in Step 500, the flow starts, and both the SoC 110 and the storage device 130 are powered on and complete their initialization operations. In Step 502, the core circuit 112 establishes a command, which follows the format shown in FIG. 2, and writes the command into the submission queue 152. At this time, the SoC 110 uses a doorbell mechanism to notify the storage device 130, allowing the storage device 130 to be aware of the pending command. It should be noted that the doorbell mechanism is well known to NVMe-related professionals, so the details are not described here.

In Step 504, the core circuit 112 sets the security information corresponding to the command in the sibling submission queue 300 located in memory 420, where the structure of the security information is shown in FIG. 3. In this embodiment, the entry number (or index value) of the command in the submission queue 152 is the same as the entry number of the corresponding security information in the sibling submission queue 300.

In Step 506, the storage device 130 begins to perform read or write operations based on the command. For example, when the command is a write command, the storage device 130 prepares to read data from DRAM 120 based on the physical addresses in the PRP1 and PRP2 shown in FIG. 2. In addition, when the command is a read command, the storage device 130 writes its data to the corresponding physical addresses in the PRP1 and PRP2 of the DRAM 120, as shown in FIG. 2.

In Step 508, the address filter 430 in the security control circuit 114 checks whether the queue identity, index value, and OLBA of the PRP1 of the command conform to the required format, and retrieves the corresponding security information from the sibling submission queue 300. Specifically, the address filter 430 can extract the security information from the sibling submission queue 300 that has the same index value as the one in the PRP1 of the command.

In Step 510, the address filter 430 calculates one or more logical block addresses, security key and encryption/decryption information corresponding to the command based on one or more OLBAs in the command, as well as the SLBA, security key and encryption/decryption information from the security information.

In Step 512, the address filter 430 transmits one or more logical block addresses, security key and encryption/decryption information corresponding to the command to the security engine 116 via the security engine interface 450.

In Step 514, the security engine 116 encrypts or decrypts the data based on the received one or more logical block addresses, security key and encryption/decryption information corresponding to the command. For example, if the command is a write command, the security engine 116 encrypts the data in the DRAM 120 and then transmits the encrypted data to the storage device 130 through other components. If the command is a read command, the security engine 116 decrypts the data from the storage device 130 and temporarily stores the decrypted data in the DRAM 120.

In summary, through the security mechanism described in the above embodiments, the SoC 110 only requires a modification of the command structure stored in the submission queue 152 in software, and the addition of a sibling submission queue 300 to store security information. In hardware, only a simple security control circuit 114 and a security engine 116 need to be designed, enabling efficient and on-the-fly encryption and decryption operations to resolve the issues of previous technologies.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a storage device, performed by a system-on-chip (SoC), comprising:

establishing, by a core circuit of the SoC, a command and writing the command into an entry of a submission queue, wherein the command comprises a queue identity of the submission queue, an index value of the entry, a logical block address offset and a physical address;

setting, by the core circuit, a sibling submission queue, wherein the sibling submission queue comprises multiple security information;

retrieving, by a security control circuit of the SoC, specific security information from the sibling submission queue according the queue identity corresponding to the command and the index value of the entry; and encrypting or decrypting, by a security engine of the SoC, data according to the logical block address offset of the command and the specific security information.

2. The method of claim 1, wherein the specific security information comprises a starting logical block address, a security key and encryption/decryption information.

3. The method of claim 2, wherein the step of encrypting or decrypting, by the security engine of the SoC, the data according to the logical block address offset of the command and the specific security information comprises:

if the encryption/decryption information indicates that the command is a write command, encrypting the data and sending encrypted data to the storage device; and if the encryption/decryption information indicates that the command is a read command, receiving the data from the storage device and decrypting the data.

4. The method of claim 2, wherein the step of encrypting or decrypting, by the security engine of the SoC, the data according to the logical block address offset of the command and the specific security information comprises:

obtaining one or more logical block addresses, the encryption key and the encryption/decryption information according to the logical block address offset and the specific security information, to encrypt or decrypt the data.

5. The method of claim 1, wherein the storage device comprises a flash memory controller and a flash memory module.

6. A system-on-chip (SoC) configured to access a storage device, comprising:

a core circuit, configured to establish a command and write the command into an entry of a submission queue, wherein the command comprises a queue identity of the submission queue, an index value of the entry, a logical block address offset and a physical address; and set a sibling submission queue, wherein the sibling submission queue comprises multiple security information;

a security control circuit, configured to retrieving specific security information from the sibling submission queue according the queue identity corresponding to the command and the index value of the entry; and a security engine, configured to encrypt or decrypt data according to the logical block address offset of the command and the specific security information.

7. The SoC of claim 6, wherein the specific security information comprises a starting logical block address, a security key and encryption/decryption information.

8. The SoC of claim 7, wherein if the encryption/decryption information indicates that the command is a write command, the security engine encrypts the data and sends encrypted data to the storage device; and if the encryption/decryption information indicates that the command is a read command, the security engine receives the data from the storage device and decrypts the data.

9. The SoC of claim 7, wherein the security control circuit obtains one or more logical block addresses, the encryption key and the encryption/decryption information according to the logical block address offset and the specific security information, to encrypt or decrypt the data.

10. The SoC of claim 6, wherein the storage device comprises a flash memory controller and a flash memory module.

* * * * *